(12) United States Patent
Pau et al.

(10) Patent No.: US 10,585,937 B2
(45) Date of Patent: Mar. 10, 2020

(54) METHOD FOR VISUAL SEARCH, CORRESPONDING SYSTEM, APPARATUS AND COMPUTER PROGRAM PRODUCT

(71) Applicant: STMicroelectronics S.r.l., Agrate Brianza (IT)

(72) Inventors: Danilo Pietro Pau, Sesto San Giovanni (IT); Alioscia Petrelli, Fermo (IT); Luigi Di Stefano, Bologna (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 508 days.

(21) Appl. No.: 15/070,470

(22) Filed: Mar. 15, 2016

(65) Prior Publication Data
US 2017/0060904 A1 Mar. 2, 2017

(30) Foreign Application Priority Data

Aug. 28, 2015 (IT) .................... 102015000047134

(51) Int. Cl.
*G06F 17/30* (2006.01)
*G06F 16/583* (2019.01)
*G06F 16/58* (2019.01)

(52) U.S. Cl.
CPC ...... *G06F 16/5854* (2019.01); *G06F 16/5838* (2019.01); *G06F 16/5866* (2019.01); *G06F 16/583* (2019.01); *G06F 16/5862* (2019.01)

(58) Field of Classification Search
CPC ......... G06F 17/30247; G06F 17/30256; G06F 17/3028; G06F 17/30268; G06F 17/3033;
(Continued)

(56) References Cited

U.S. PATENT DOCUMENTS

| 8,352,494 B1* | 1/2013 | Badoiu | ............. G06F 17/30256 707/772 |
| 8,782,077 B1* | 7/2014 | Rowley | ............. G06F 17/30864 707/769 |

(Continued)

FOREIGN PATENT DOCUMENTS

| CN | 101739397 A | 6/2010 |
| CN | 101777064 A | 7/2010 |

(Continued)

OTHER PUBLICATIONS

"Information Technology—Multimedia content description interface—Part 13: Compact descriptors for visual search," International Organisation for Standardisation, ISO/IEC JTC1/SC 29/WG11 MPEG2014/N14956, Oct. 2014, 139 pages.

(Continued)

*Primary Examiner* — Dangelino N Gortayo
(74) *Attorney, Agent, or Firm* — Seed IP Law Group LLP

(57) ABSTRACT

Local descriptors are extracted from digital image information and digital depth information related to digital images. The local descriptors convey appearance description information and shape description information related to the digital images. Global representations of the one or more digital images are generated based on the extracted local descriptors, and are hashed. Visual search queries are generated based on the hashed global representations. The visual search queries include fused appearance description information and shape description information conveyed in the local descriptors. The fusing may occur before the global representations are generated, before the hashing or after the hashing.

25 Claims, 3 Drawing Sheets

(58) Field of Classification Search
CPC ........... G06F 17/3025; G06F 17/30259; G06F 17/30097; G06F 17/30262; G06F 17/30271; G06K 9/46
USPC ................ 707/772, 758, 769, 747, 780, 915
See application file for complete search history.

(56) References Cited

U.S. PATENT DOCUMENTS

| | | | | |
|---|---|---|---|---|
| 8,885,984 | B1* | 11/2014 | Lavi | G06K 9/4671 382/181 |
| 9,135,277 | B2* | 9/2015 | Petrou | G06F 16/5838 |
| 9,424,461 | B1* | 8/2016 | Yuan | G06K 9/00201 |
| 9,489,401 | B1* | 11/2016 | Garcia | G06F 16/9535 |
| 9,836,483 | B1* | 12/2017 | Hickman | G06F 17/30277 |
| 9,916,345 | B1* | 3/2018 | Makadia | G06F 17/30386 |
| 2012/0113109 | A1 | 5/2012 | Lee | |
| 2014/0052737 | A1* | 2/2014 | Ramanathan | G06F 17/30799 707/747 |
| 2014/0201200 | A1 | 7/2014 | Li et al. | |
| 2014/0310314 | A1 | 10/2014 | Li et al. | |
| 2015/0016712 | A1* | 1/2015 | Rhoads | G06K 9/00208 382/154 |
| 2015/0049955 | A1* | 2/2015 | Stoeffler | G06K 9/6202 382/220 |
| 2015/0063681 | A1* | 3/2015 | Bhardwaj | G06K 9/00208 382/154 |
| 2015/0227796 | A1* | 8/2015 | Holzschneider | G06F 16/51 382/103 |
| 2016/0110356 | A1* | 4/2016 | Kruglick | G06K 9/46 707/747 |
| 2016/0132720 | A1* | 5/2016 | Klare | G06F 16/51 382/118 |
| 2016/0232678 | A1* | 8/2016 | Kurz | G06F 17/50 |
| 2017/0154056 | A1* | 6/2017 | Qiu | G06F 17/30256 |
| 2018/0012105 | A1* | 1/2018 | Fan | G06K 9/00664 |

FOREIGN PATENT DOCUMENTS

| | | |
|---|---|---|
| CN | 102262670 A | 11/2011 |
| CN | 102842133 A | 12/2012 |
| CN | 102902807 A | 1/2013 |
| CN | 103617420 A | 3/2014 |
| CN | 104200233 A | 12/2014 |
| CN | 104504162 A | 4/2015 |
| CN | 205721777 U | 11/2016 |

OTHER PUBLICATIONS

Blum et al., "A Learned Feature Descriptor for Object Recognition in RGB-D Data," *IEEE International Conference on Robotics and Automation (ICRA)*, 2012, 6 pages.
Bo et al., "Depth Kernel Descriptors for Object Recognition," *IEEE/RSJ International Conference on Intelligent Robots and Systems (IROS)*, 2011, 6 pages.
Bo et al., "Efficient Match Kernel between Sets of Features for Visual Recognition," *Advances in Neural Information Processing Systems*, 2009, 9 pages.
Bo et al., "Kernel Descriptors for Visual Recognition," *IEEE/RSJ International Conference on Intelligent Robots and Systems (IROS)*, 2011, 9 pages.
Bo et al., "Unsupervised Feature Learning for RGB-D Based Object Recognition," *Experimental Robotics. Springer International Publishing*, 2013, 15 pages.
Browatzki et al., "Going into depth: Evaluating 2D and 3D cues for object classification on a new, large-scale object dataset," *IEEE International Conference on Computer Vision Workshops (ICCV Workshops)*, 2011, 7 pages.
Calonder et al., "BRIEF: Binary Robust Independent Elementary Features," *Computer Vision—ECCV*, 2010, 14 pages.
Chandrasekhar et al., "Compressed Histogram of Gradients: A Low-Bitrate Descriptor," *International Journal of Computer Vision*, 2011, 16 pages.
Chandrasekhar et al., "Feature Matching Performance of Compact Descriptors for Visual Search," *Data Compression Conference (DCC), IEEE*, 2014, 10 pages.
Chandrasekhar et al., "Survey of SIFT Compression Schemes," *Proceedings of International Workshop Mobile Multimedia Processing*, 2010, 4 pages.
Chen et al., "Tree Histogram Coding for Mobile Image Matching," *Data Compression Conference DCC '09. IEEE*, 2009, 10 pages.
Dudani, "The Distance-Weighted k-Nearest-Neighbor Rule," *IEEE Transactions on Systems, Man, and Cybernetics* 4:325-327, 1976.
Endres et al., "3D Mapping with an RGB-D Camera," *IEEE Transactions on Robotics* 30(1):1-11, 2012.
Girod et al., "Mobile Visual Search," *IEEE Signal Processing Magazine, Special Issue on Mobile Media* Search, pp. 1-11, 2011.
Gupta et al., "Learning Rich Features from RGB-D Images for Object Detection and Segmentation," *Computer Vision—ECCV*, Springer International Publishing, 2014, 16 pages.
Heo et al., "Spherical Hashing," *IEEE Conference on Computer Vision and Pattern Recognition (CVPR)*, 2012, 8 pages.
Indyk et al., "Approximate Nearest Neighbors: Towards Removing the Curse of Dimensionality," *Proceedings of the Thirtieth Annual ACM Symposium on Theory of Computing. ACM*, 1999, 20 pages.
Jaakkola et al., "Exploiting generative models in discriminative classifiers," *Advances in Neural Information Processing Systems*, 1999, 11 pages.
Jégou et al., "Aggregating local descriptors into a compact image representation," *IEEE Conference on Computer Vision and Pattern Recognition (CVPR)*, 2010, 9 pages.
Ji et al., "Location Discriminative Vocabulary Coding for Mobile Landmark Search," *International Journal of Computer Vision* 96(3), 2012, 25 pages.
Johnson "Generalized Descriptor Compression for Storage and Matching," *BMVC*, 2010, 11 pages.
Johnson et al., "Using Spin Images for Efficient Object Recognition in Cluttered 3D Scenes," *IEEE Transactions on Pattern Analysis and Machine Intelligence* 21(5):433-449, May 1999.
Krizhevsky et al., "ImageNet Classification with Deep Convolutional Neural Networks," *Advances in Neural Information Processing Systems*, 2012, 9 pages.
Lai et al., "A Large-Scale Hierarchical Multi-View RGB-D Object Dataset," *IEEE International Conference on Robotics and Automation (ICRA)*, 2011, 8 pages.
Lazebnik et al., "Beyond Bags of Features: Spatial Pyramid Matching for Recognizing Natural Scene Categories," *IEEE Computer Society Conference on Computer Vision and Pattern Recognition 2*, 2006, 8 pages.
Lepsoy et al., "Statistical Modelling of Outliers for Fast Visual Search" *IEEE International Conference on Multimedia and Expo (ICME), IEEE*, 2011, 6 pages.
Lowe, "Distinctive Image Features from Scale-Invariant Keypoints," *International Journal of Computer Vision* 60(2), 2004, 28 pages.
Lv et al., "Multi-Probe LSH: Efficient Indexing for High-Dimensional Similarity Search," *Proceedings of the 33rd International Conference on Very Large Data Bases. VLDB Endowment*, 2007, 12 pages.
Malaguti et al., "Toward compressed 3D descriptors," *IEEE Second (Joint) International Conference on3D Imaging, Modeling, Processing, Visualization and Transmission (3DIMPVT)*, 2012, 8 pages.
Nakashika et al., "3D-Object Recognition Based on LLC Using Depth Spatial Pyramid," *2014 22nd International Conference on Pattern Recognition*, 2014, 5 pages.
Nascimento et al., "BRAND: A Robust Appearance and Depth Descriptor for RGB-Images," *IEEE/RSJ International Conference on Intelligent Robots and Systems (IROS)*, 2012, 7 pages.
Permonnin et al., "Fisher Kernels on Visual Vocabularies for Image Categorization," *IEEE Conference on Computer Vision and Pattern Recognition, CVPR'07*, 2007, 8 pages.
Petrelli et al., "Analysis of compact features for RGB-D visual search," *Image Analysis and Processing—ICIAP*, 2015, 11 pages.
Petrelli et al., "RGB-D Visual Search with Compact Binary Codes," *IEEE International Conference on 3D Vision (3DV)*, 2015, 8 pages.

(56) References Cited

OTHER PUBLICATIONS

Shotton et al., "Real-Time Human Pose Recognition in Parts from Single Depth Images," *Communications of the ACM* 56(1), 2013, 8 pages.
Singh et al., "BigBIRD: A Large-Scale 3D Database of Object Instances," *IEEE International Conference on Robotics and Automation (ICRA)*, 2014, 8 pages.
Socher et al., "Convolutional-Recursive Deep Learning for 3D Object Classification," *Advances in Neural Information Processing Systems*, 2012, 9 pages.
Trzcinski et al., "Boosting Binary Keypoint Descriptors," *IEEE Conference on Computer Vision and Pattern Recognition*, 2013, 8 pages.
Venkataraman et al., "*PiCam*: An Ultra-Thin High Performance Monolithic Camera Array," *ACM Transactions on Graphics (TOG)* 32(6), 2013, 13 pages.
Yu et al., "Learning Hierarchical Representation with Sparsity for RGB-D Object Recognition," *Intelligent Robots and Systems (IROS)*, 2012, 6 pages.
Chinese Office Action, dated Jan. 31, 2019, for Chinese Application No. 201610191514.9, 5 pages.

\* cited by examiner

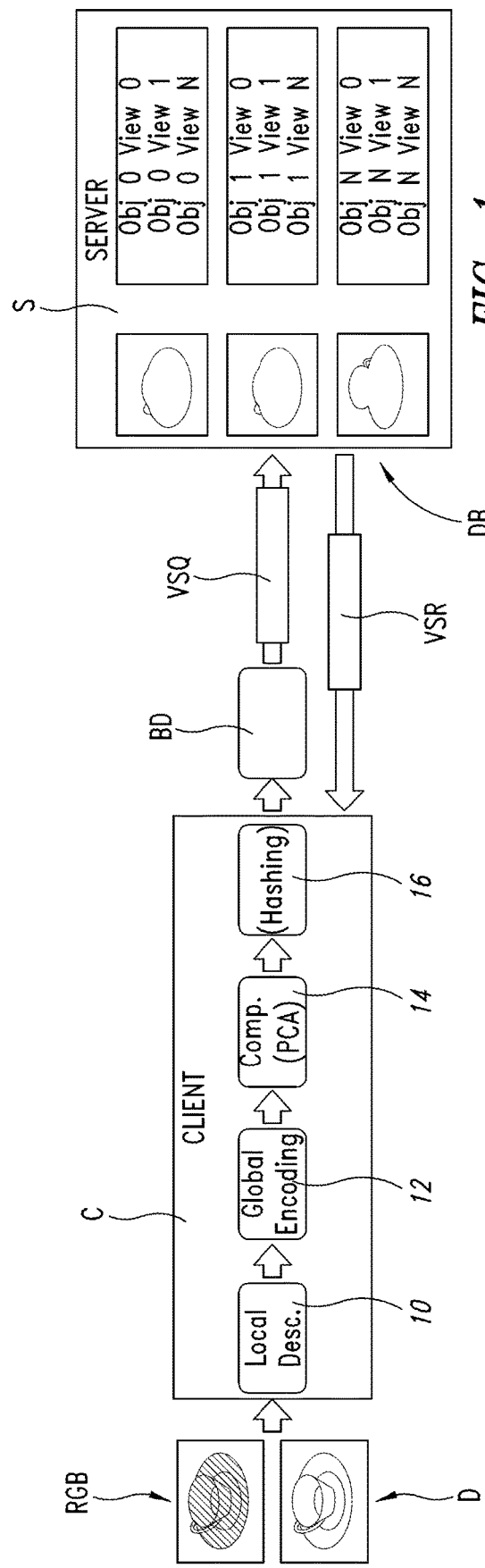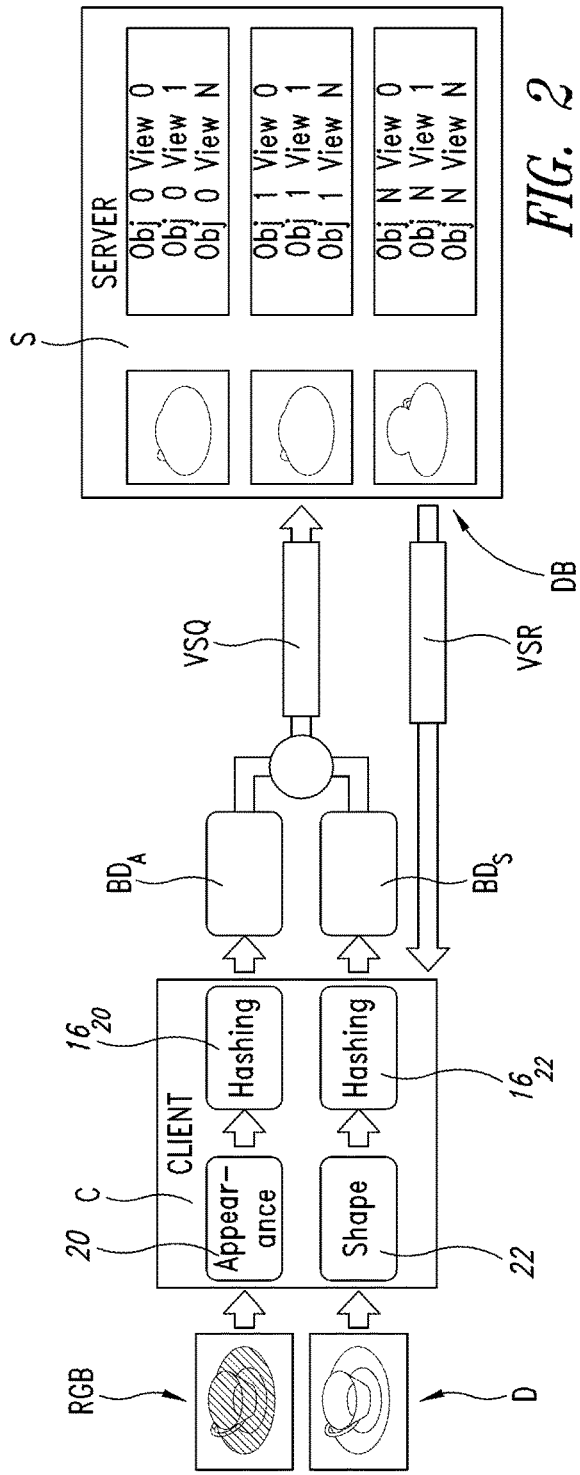

METHOD FOR VISUAL SEARCH, CORRESPONDING SYSTEM, APPARATUS AND COMPUTER PROGRAM PRODUCT

BACKGROUND

Technical Field

The description relates to visual search techniques, e.g., to visual search in mobile devices.

Description of the Related Art

Nowadays most mobile devices may be equipped with high-resolution cameras and be capable of connecting to the Internet. This has fostered developments and increasing diffusion of a variety of mobile visual search tools, such as e.g., those known under the commercial names of Google Goggles™, Amazon™, CamFind™, Vuforia™, and WeChat Image Platform™.

A mobile visual search engine may enable a user to gather information about the objects seen in the camera field of view. Purposely, she/he would just snap a picture and the mobile device may then compute a representation of the image which is sent to a remote server and matched into a database to recognize image content and report back relevant information.

A continuous demand thus exists for improved visual search techniques which may be adapted for use e.g., in mobile devices.

BRIEF SUMMARY

In an embodiment, a method comprises: extracting, using digital image processing circuitry, local descriptors from digital image information and digital depth information related to one or more digital images, the local descriptors conveying appearance description information and shape description information related to said one or more digital images; generating, using the digital image processing circuitry, one or more global representations of the one or more digital images based on the extracted local descriptors; hashing, using the digital image processing circuitry, the one or more global representations of the one or more digital images; and generating, using the digital image processing circuitry, one or more visual search queries based on the hashed one or more global representations, wherein the one or more visual search queries include fused appearance description information and shape description information conveyed in the local descriptors. In an embodiment, the method comprises: fusing local descriptors extracted from said digital image information and local descriptors extracted from said digital depth information; and generating the one or more global representations of the one or more digital images based on the fused local descriptors. In an embodiment, the method comprises: fusing appearance description information and shape description information included in the one or more global representations; and subsequently hashing the one or more global representations. In an embodiment, the method comprises fusing appearance description information and shape description information after the hashing of the one or more global representations. In an embodiment, the digital image information includes digital color information. In an embodiment, the one or more digital images comprise RGB-D digital images. In an embodiment, the method comprises: selectively varying respective amounts of said appearance description information and shape description information included in the fused appearance description information and shape description information of the visual search queries.

In an embodiment, an apparatus comprises: one or more memories, which, in operation, store digital image information; and digital image processing circuitry coupled to the one or more memories, wherein the digital image processing circuitry, in operation: extracts local descriptors from digital image information and digital depth information related to one or more digital images, the local descriptors conveying appearance description information and shape description information related to said one or more digital images; generates one or more global representations of the one or more digital images based on the extracted local descriptors; hashes the one or more global representations of the one or more digital images; and generates one or more visual search queries based on the hashed one or more global representations, wherein the one or more visual search queries include fused appearance description information and shape description information conveyed in the local descriptors. In an embodiment, the digital image processing circuitry, in operation: fuses local descriptors extracted from said digital image information and local descriptors extracted from said digital depth information; and generates the one or more global representations of the one or more digital images based on the fused local descriptors. In an embodiment, the digital image processing circuitry, in operation: fuses appearance description information and shape description information included in the one or more global representations; and hashes the one or more global representations including the fused appearance description information and shape description information. In an embodiment, the digital image processing circuitry, in operation, fuses appearance description information and shape description information included in the hashed one or more global representations. In an embodiment, the one or more digital images comprise RGB-D digital images. In an embodiment, the digital image processing circuitry, in operation, selectively varies respective amounts of said appearance description information and shape description information included in the fused appearance description information and shape description information of the visual search queries. In an embodiment, the digital image processing circuitry, in operation, selective varies the respective amounts in response to a visual search response signal. In an embodiment, the apparatus comprises an integrated circuit including the digital image processing circuitry.

In an embodiment, a system comprises: one or more image capture devices, which, in operation, capture digital images; and digital image processing circuitry, which, in operation: extracts local descriptors from digital image information and digital depth information related to one or more captured digital images, the local descriptors conveying appearance description information and shape description information related to said one or more digital images; generates one or more global representations of the one or more digital images based on the extracted local descriptors; hashes the one or more global representations of the one or more digital images; and generates one or more visual search queries based on the hashed one or more global representations, wherein the one or more visual search queries include fused appearance description information and shape description information conveyed in the local descriptors. In an embodiment, the digital image processing circuitry, in operation: fuses local descriptors extracted from said digital image information and local descriptors extracted from said digital depth information; and generates the one or more global representations of the one or more digital images based on the fused local descriptors. In an embodiment, the digital image processing circuitry, in operation: fuses appearance description information and shape description information included in the one or more global representations; and hashes the one or more global representations including the fused appearance description information and shape description information. In an embodiment, the digital image processing circuitry, in operation, fuses appearance description information and shape description information included in the hashed one or more global representations. In an embodiment, the digital image processing circuitry, in operation, selectively varies respective amounts of said appearance description information and shape description information included in the fused appearance description information and shape description information of the visual search queries.

In an embodiment, a non-transitory computer-readable medium's contents cause digital image processing circuitry to generate one or more visual search queries, by: extracting local descriptors from digital image information and digital depth information related to one or more digital images, the local descriptors conveying appearance description information and shape description information related to said one or more digital images; generating one or more global representations of the one or more digital images based on the extracted local descriptors; hashing the one or more global representations of the one or more digital images; and generating one or more visual search queries based on the hashed one or more global representations, wherein the one or more visual search queries include fused appearance description information and shape description information conveyed in the local descriptors. In an embodiment, the contents cause the digital image processing circuitry to perform at least one of: fusing local descriptors extracted from said digital image information and local descriptors extracted from said digital depth information; fusing appearance description information and shape description information included in the one or more global representations; and fusing appearance description information and shape description information included in the hashed one or more global representations. In an embodiment, the contents cause the digital image processing circuitry to selectively vary respective amounts of said appearance description information and shape description information included in the fused appearance description information and shape description information of the visual search queries.

In an embodiment, a method of generating queries for visual searches comprises: acquiring input images both as digital image information and as digital depth information; extracting from said digital image information and digital depth information local descriptors conveying an appearance description and a shape description of said images; generating visual search queries by fusing said appearance description and said shape description of said images, wherein the method includes: applying to local descriptors extracted from said digital image information and digital depth information processing including: i) global encoding by aggregating local descriptors extracted from said digital image information and digital depth information into a global encoding of said images, and ii) hashing said global encoding of said images; and generating said visual search queries from the results of said global encoding and said hashing. In an embodiment, the method includes fusing said appearance description and said shape description of said images by fusing the local descriptors extracted from said digital image information and digital depth information before said global encoding and said hashing processing. In an embodiment, the method includes fusing said appearance description and said shape description of said images by fusing the local descriptors extracted from said digital image information and digital depth information after said global encoding and before said hashing processing. In an embodiment, the method includes fusing said appearance description and said shape description of said images by fusing the local descriptors extracted from said digital image information (RGB) and digital depth information after said global encoding and said hashing processing. In an embodiment, the method includes acquiring said images by acquiring both digital color image information and depth information, preferably as a RGB-D image. In an embodiment, the method includes selectively varying the respective amounts of said appearance description and said shape description of said images fused in generating said visual search query. In an embodiment, a system for generating queries for visual searches from images acquired both as digital image information and as digital depth information, includes: local descriptor extraction means for extracting from said digital image information and digital depth information local descriptors conveying an appearance description and a shape description of said images; at least one fusion module for generating visual search queries by fusing said appearance description and said shape description of said images, wherein the system includes processing means for applying to local descriptors extracted from said digital image information and digital depth information processing including: i) global encoding by aggregating local descriptors extracted from said digital image information and digital depth information into a global encoding of said images, and ii) hashing said global encoding of said images; wherein the system is configured for generating said visual search queries from the results of said global encoding and said hashing according to a method disclosed herein. In an embodiment, the system includes a plurality of fusion modules selectively activatable for fusing said appearance description and said shape description of said images by any of: fusing local descriptors extracted from said digital image information and digital depth information before said global encoding and said hashing processing; fusing the local descriptors extracted from said digital image information and digital depth information after said global encoding and before said hashing processing; fusing the local descriptors extracted from said digital image information and digital depth information after said global encoding and said hashing processing. In an embodiment, the system includes an image capture device configured for acquiring images both as digital image information and as digital depth information. In an embodiment, said image capture device is configured to acquire said images both digital as color image information and as digital depth information. In an embodiment, the images is an RGB-D image.

One or more embodiments may relate to a system and apparatus (e.g., a mobile communication device such as a smartphone, tablet or the like equipped with an image capture device e.g., a RGB-D camera) as well as to a computer program product loadable into the memory of at least one processing device and including software code portions for executing the steps of one or more of the methods disclosed herein when the product is run on at least one computer. As used herein, reference to such a computer program product is understood as being equivalent to reference to a computer-readable medium containing instructions for controlling the processing system in order to co-ordinate implementation of the method according to one or more embodiments. Reference to "at least one processor device" is intended to highlight the possibility for one or more embodiments to be implemented in modular and/or distributed form.

One or more embodiments may permit e.g., to integrate depth sensing in mobile devices.

One or more embodiments may permit merging appearance and shape information in mobile visual searches.

One or more embodiments may provide e.g., a RGB-D search engine architecture capable of high recognition rates with moderate bandwidth requirements.

One or more embodiment may compare favorably to a CDVS (Compact Descriptors for Visual Search) pipeline and effectively contribute to the joint deployment of depth and color in mobile visual searches.

BRIEF DESCRIPTION OF THE DRAWINGS

One or more embodiments will now be described, by way of example only, with reference to the annexed figures, wherein:

FIGS. 1 and 2 are schematic functional representations of one or more embodiments in their possible contexts of use;

DETAILED DESCRIPTION

Figure 3:
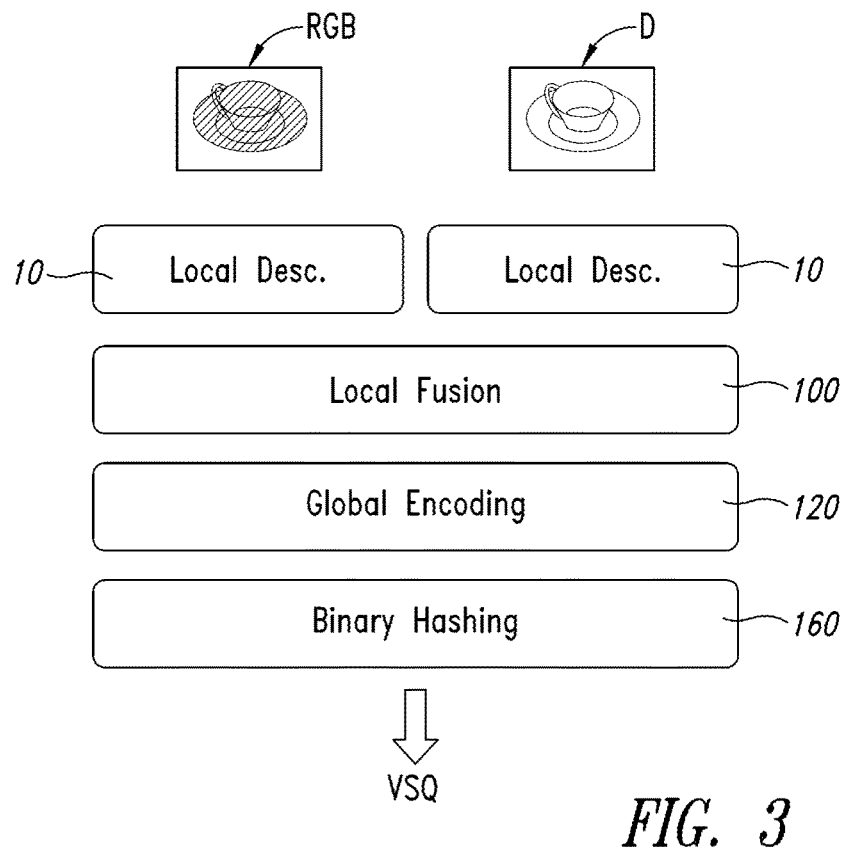
FIG. 3 is a schematic representation of one or more embodiments.

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

In the following, reference will be repeatedly made to the documents listed in the List of References which appears at the end of this exemplary description. Each document will be referred to by indicating between square parentheses the corresponding number in the list, e.g. [X].

In mobile visual search applications a query image may be acquired by a mobile device, sent across the Internet and compared to a database of images stored into a server so as to obtain meaningful information related to its content.

Technological advances and diffusion of mobile devices equipped with high-resolution cameras have promoted research in mobile visual search [15, 12, 21, 10] and fostered the advent of both applications and development tools, such as those known under the trade names Google Goggles™, Amazon Flow™, CamFind™, Vuforia™, WeChat Image Platform™ already referred to in the foregoing.

A mobile visual search client may transmit information to the server over a wireless channel, and the search engine may be subject to bandwidth requirements so as to reduce latency, cut down device power consumption and enhance user experience.

Several approaches have been proposed in the literature [8, 9, 11, 22, 32] directed at either conceiving compact image descriptors or compressing existing descriptors. In addition to addressing bandwidth requirements, research on compact and binary description is also driven by the demand for handling databases that nowadays may comprise millions of images. Indeed, the ability to encode image content with as few bits as possible has become a key factor in properly dealing with storage issues and permitting efficient image matching.

Over the last few years affordable and effective RGB-D cameras (e.g., cameras delivering both color and depth information), such as e.g., those marketed under the trade names Microsoft Kinect™ or Creative Senz3D™, have led to the development of novel, sometimes groundbreaking, approaches to address hard vision problems like human pose recognition [29], SLAM [14], object recognition [5], object detection and semantic segmentation [16].

Trends towards ever increasing miniaturization of sensors, advances in 3D computer vision, growing development of software tools dedicated to mobile platforms, appear to build momentum for integration of depth sensing into mobile devices at a large scale.

Exemplary of these developments is e.g., the device known under the trade name of Structure Sensor™ by Occipital, a structured light depth camera that can be clipped onto a tablet which, while originally designed for iOS devices, can work with Android™ and Windows™ OSs as well. In [33], Pelican imaging proposed a camera array that captures light fields and synthesizes a range image. The camera is small enough to be embedded into smartphones. In 2014 HTC released the HTC One (M8) smartphone, which combines the main RGB camera with a 2-megapixel depth sensor, and delivered the Dual Lens SDK to stimulate development of 3D applications on Android. Project Tango™ by Google has recently started shipping to professionals and researchers a prototype tablet equipped with 3D sensing capabilities and up-to-date APIs.

One or more embodiments may thus involve joint deployment of color and depth in the realm of mobile visual search, which may be supported e.g., by the availability of depth sensing in mobile devices and by achievements enabled by RGB-D imagery across a variety of computer vision tasks.

One or more embodiments may permit merging the contributions provided by the color and depth channels and encoding them in a compact binary code.

One or more embodiments may thus provide a visual search engine suitable for use in mobile devices equipped with RGB-D cameras.

Research on object recognition over the past years has yielded a large body of work that leverages on RGB-D sensing [23, 5, 34, 2, 31, 27, 16].

These proposals rely on a computational flow which may not be adapted for mobile visual search, as the RGB and depth images are encoded into very long representations: e.g., in [31] (R. Socher, B. Huval, B. Bhat, C. D. Manning, and A. Y. Ng, Convolutional-Recursive Deep Learning for 3D Object Classification, *Advances in Neural Information Processing Systems*, pages 1-9, 2012), Socher et al. stack a recursive neural network on a layer of CNN to build a feature vector of 32,000 elements, whereas in [5] (L. Bo, X. Ren, and D. Fox, Unsupervised feature learning for rgb-d based object recognition, *International Symposium on Experimental Robotics*, pages 1-15, 2012) the resulting descriptor has as many as 188,300 dimensions. Then, this rich description may feed a classifier, such as a SVM or a Random Forest™, that, depending of the task, recognizes either the object category or instance associated with image content.

In mobile visual search scenarios compactness of description may represent a key factor. Furthermore, a classifier is confined to recognition of learned classes only and may require an expensive training process to work with new classes. Conversely, a visual search engine for e.g., mobile applications should feature a high flexibility so to enable easy and fast updating of the database of images to be seamlessly handled by the application.

A similarity search approach dealing with matching the query into a database of candidate images may thus be more suited to mobile visual search scenarios than a trained classifier, as also vouched by the reference architecture established within the Compact Descriptors for Visual Search (CDVS) [1] (ISO/IEC JTC 1/SC 29/WG 11, Information technology Multimedia content description interface—Part 13: Compact descriptors for visual search (2014)) proposal, now considered to become part of the MPEG-7 standard.

An overall architecture of a visual search engine applicable to one or more embodiments is exemplified in FIG. 1.

In one or more embodiments a set of patches may be extracted from a pair of RGB and depth images (denoted as RGB and D, respectively) at the client side C and described. It will be appreciated that in one or more embodiments the foregoing may also be regarded as local descriptor extraction from a (single) RGB-D image, that is image information including both RGB image (that is a digital color image) and depth information D (that is a depth map associated with the image).

Also, while in the following depth information (depth channel) will be assumed to be made available by obtaining it directly when acquiring an image (e.g., RGB-D) used as a basis for generating a visual search query, in one or more embodiments the depth information may be acquired "indirectly" e.g., by means of a stereo matching process applied to two or more images obtained from different viewpoints e.g., by means of a RGB camera mounted in a mobile device.

Similarly, referring to RGB color images in this detailed description is merely by way of example. One or more embodiments may in fact involve using different color spaces. For instance, in one or more embodiments using a YUV space may be considered, where (only) e.g., the Y component is used for extracting e.g., appearance-based features.

This otherwise explains that, while implementation of one more embodiments may be facilitated by starting from color images (e.g., RGB, as considered herein by way of example), certain embodiments may use non-color, e.g., grey scale images.

In one or more embodiments, so-called RGB-D Kernel Descriptors as described e.g., in [3, 4] (L. Bo, X. Ren, and D. Fox. Kernel descriptors for visual recognition, *Advances in Neural Information Processing Systems* 23, pages 1-9, 2010; L. Bo, X. Ren, and D. Fox, Depth kernel descriptors for object recognition. *Intelligent Robots and Systems*, 2011), may be used for that purpose as these descriptors may achieve competitive results over a variety of RGB-D recognition tasks.

Kernel descriptors are a generalization of descriptors based on orientation histograms, such as SIFT and HOG, which may suffer of quantization errors e.g., due to binning. Kernel descriptors may overcome this issue by defining the similarity between two patches through kernel functions, called match kernels, that average out across the continuous similarities between all pairs of pixel attributes within the two patches.

A certain number e.g., 8 types of kernel descriptors may be devised by defining match kernels for different patch attributes like intensity and depth gradient, color and object size.

In one or more embodiments, a local description stage 10 of a search engine may deploy grid-based detection to obtain a set of patches from the image which may be represented e.g., by 200-dimensional descriptions. In a subsequent global encoding stage 12 the local descriptors obtained at 10 may be aggregated to a Global Encoding of the whole image.

Various approaches may be considered in one or more embodiments for global encoding at 12 in order to "condense" the information previously extracted locally across the image.

These approaches may include, e.g., the technique known as VLAD. See [20] (H. Jegou, M. Douze, C. Schmid, and P. Perez. Aggregating local descriptors into a compact image representation. *Conference on Computer Vision and Pattern Recognition*, 2010). There, at training time, a set of $N_C$ visual words is learned via k-means clustering in the space of the local descriptors extracted from the training database. At encoding time, for each local description d, of length D, the nearest visual word $c_i$ is found and the vector $d-c_i$ is computed and associated to $c_i$. Therefore, for each visual word $c_i$, the associated vectors $d-c_i$ are summed to form the vector $e_i$. Finally, all the $e_i$'s are juxtaposed to form the global $D \times N_C$ dimensional representation of the image.

Another possible approach is Fisher kernels. In [19] (T. Jaakkola and D. Haussler, Exploiting generative models in discriminative classifiers, *Advances in Neural Information Processing Systems*, 1999), Jaakkola and Haussler introduced Fisher kernels with the aim to combine the power of discriminative classifiers with the ability of generative models to handle representations comprising a variable number of measurement samples. The encoding vector is the gradient of the samples log-likelihood with respect to the parameters of the generative model, and, intuitively, it can be seen as the contribution of the parameters to the generation of the samples. Perronnin et al. in [28] F. Perronnin and C. Dance, Fisher kernels on visual vocabularies for image categorization, *Conference on Computer Vision and Pattern Recognition*, 2007, applied Fisher kernels to image classification by modeling visual vocabularies with Gaussian mixture models (GMM). In one or more embodiments, for each of the $N_G$ components of the mixture, the mean values and the elements of the covariance matrices (assumed to be diagonal) may be taken as parameters. Thus, the global encodings have length $2 \times D \times N_G$.

Still another possible approach is Efficient Match Kernels or EMK. See [6] (L. Bo and C. Sminchisescu, Efficient match kernel between sets of features for visual recognition, *Advances in Neural Information Processing Systems*, pages 1-9, 2009). Similarly to kernel descriptors in exploiting match kernels to overcome the potential loss of descriptiveness due to binning in orientation histogram descriptors, Efficient Match Kernels (EMK) may generalize the bag-of-words aggregation scheme to counteract binning errors. This method is particularly adapted for aggregating local kernel descriptors into image-level representations. EMK is a general purpose method that could be trained on any kind of local descriptors, not only on kernel descriptors.

Unlike VLAD and Fisher kernels, EMK may take into account spatial information by performing the encoding using a spatial pyramid as disclosed e.g., by Lazebnik et al. in [24] (S. Lazebnik, C. Schmid, and J. Ponce, Beyond bags of features: Spatial pyramid matching for recognizing natural scene categories, *Conference on Computer Vision and Pattern Recognition*, 2006. The image is subdivided in 1×1, 2×2 and 4×4 sub-regions on three levels of abstraction and each of them is separately encoded. EMK subdivides the image in 4×4 subregions at the third level; in the case of shape-based kernel descriptors the third level of the pyramid may be divided in 3×3 sub-regions. The final description includes the concatenation of all the encodings. For local descriptions based on appearance information, the single encoding may be e.g., 500-dimensional, hence the image is represented with a (1+4+16)×500=10500 long descriptor, whereas by encoding of shape information the description reaches a length of 14000 as the single encoding may be 1000-dimensional.

One or more embodiments may take into account that the global descriptions obtained at 12 might require a large bandwidth to be sent to a database at the server side S.

One or more embodiments may thus provide for further compression, e.g., as exemplified in FIG. 1. For instance, Principal Component Analysis (PCA) may be first applied at 14 in order to both filter out correlated components and speed up the execution of the subsequent computation at 16, which, in one or more embodiments may include a similarity-preserving hashing stage aimed at producing a final compact binary description BD to be sent to a server S e.g., in support of a visual search query VSQ.

Various approaches may be considered in one or more embodiments for (e.g., binary) hashing at 16.

These may include e.g., the baseline approach referred to as Locality Sensitive Hashing (LSH) (see [18] (P. Indyk and R. Motwani, Approximate nearest neighbors: towards removing the curse of dimensionality, *Proceedings of the thirtieth annual ACM symposium on Theory of computing*, pages 604-613, 1998)) or Spherical Hashing (SH) (see [17] (J.-P. Heo, Y. Lee, J. He, S.-F. Chang, and S.-E. Yoon, Spherical hashing, *Conference on Computer Vision and Pattern Recognition*, pages 2957-2964, 2012)), which may be effective on large datasets.

If $N_b$ is the number of bits comprising the binary description, Locality Sensitive Hashing may define the hashing functions by creating a set of $N_b$ random hyper-planes in the description space. Then, to perform hashing of a new descriptor, each bit of the binary code may be labeled e.g., as 1 if the description is in the positive half-space of the associated hyperplane, and as 0 otherwise. Spherical Hashing, instead, may represent the data with a set of $N_b$ hyper-spheres and choose the value of the i-th bit depending on whether the description is inside or outside the i-th hyper-sphere. In one or more embodiments, in order to determine the centers and radii of the hyper-spheres, an iterative optimization process may be performed so as to achieve balanced partitioning of descriptions for each hash function as well as independence between any two hashing functions.

Furthermore, a distance may be adopted in the Hamming space which is well suited to this coding scheme, such as the Spherical Hamming Distance, that normalizes the standard Hamming distance by the number of corresponding bits equal to 1 between the two strings. Corresponding bits set e.g., to 1 denote that the two descriptions are inside the same hyper-sphere and therefore a higher likelihood that the two points are close in the feature space.

In one or more embodiments, insofar as the server side S is concerned, binary descriptions BD may be computed for each image representing the objects populating the database and a similarity index may be built by means of a multi-probe LSH scheme (mpLSH) proposed in [26] (Q. Lv, W. Josephson, Z. Wang, M. Charikar, and K. Li, Multi-probe LSH: efficient indexing for high-dimensional similarity search, *International Conference on Very Large Data bases*, 2007): given an image included in a visual search query VSQ, the binary code received from the client C is matched at the server S against the database DB to produce a visual search result VSR which is returned to the client device C. This may occur according to one of a wide variety possible methods e.g., by applying a weighed k-NN search as described in [13] (S. A. Dudani, The Distance-Weighted k-Nearest-Neighbor Rule, *Transactions on Systems, Man, and Cybernetics*, pages 325-327, 1976).

By way of example, the database DB is exemplified in the figures as a set of binary descriptions Obj 0, View 0, Obj N, View N, where Obj i, View j denotes a j-th view of an i-th object.

It will otherwise be appreciated that one or more embodiments may be largely independent of the approach adopted to produce a visual search result VSR in response to a visual search query VSQ.

The block diagram of FIG. 2 is exemplary of the possibility of extending the processing layout discussed in connection with FIG. 1 to visual search engine architectures which may benefit from depth sensing capabilities, once again starting from RGB and depth information (again denoted RGB and D, respectively) at the client side C.

Compactness of the description sent from the client C to the server S may be an asset for mobile visual search architectures, as this may provide a satisfying user experience even in case of limited bandwidth or network congestion.

In that respect, it was observed that research on binary codes is not limited to mobile visual search but covers the entire field of content-based image retrieval. For instance, compact and binary descriptors may play a significant role in permitting efficient storage and matching in databases comprising e.g., millions of images. This may explain why, as noted, several approaches directed at either conceiving compact image descriptors or compressing existing descriptors have been proposed in the literature see e.g., [8,9,11,22] (M. Calonder, V. Lepetit, C. Strecha, and P. Fua, Brief: Binary robust independent elementary features, *European Conference on Computer Vision*, 2010; V. Chandrasekhar, M. Makar, G. Takacs, D. Chen, S. S. Tsai, N.-M. Cheung, R. Grzeszczuk, Y. Reznik, and B. Girod, Survey of SIFT compression schemes, *International Conference on Pattern Recognition*, 2010; V. Chandrasekhar, G. Takacs, D. M. Chen, S. S. Tsai, Y. Reznik, R. Grzeszczuk, and B. Girod, Compressed Histogram of Gradients: A Low-Bitrate Descriptor, *International Journal of Computer Vision*, 2011; M. Johnson, Generalized Descriptor Compression for Storage and Matching, *British Machine Vision Conference*, pages 23.1-23.11, 2010).

Also, it was noted the research on compact representation has so far addressed primarily RGB images, while compact description of depth information is investigated e.g., in [37] (Malaguti, F., Tombari, F., Salti, S., Pau, D., Di Stefano, L., Toward Compressed 3D Descriptors, International Conference on 3D Imaging, Modeling, Processing, Visualization & Transmission 176-183 (October 2012)), which focuses on 3D point clouds, and [38] (Nascimento, E. R., Oliveira, G. L., Campos, M. F. M., Vieira, A. W., Schwartz, W. R., BRAND: A robust appearance and depth descriptor for RGB-D images, International Conference on Intelligent Robots and Systems 1720-1726 (October 2012)), which deals with RGB-D images. Both of these however propose local descriptors without addressing the issue of obtaining a compact global representation of the image.

One or more embodiments may thus address visual search scenarios by encoding both appearance and depth information (e.g., by generating binary code representative of appearance and binary code representative of depth or shape) to obtain compact binary codes to describe RGBD images.

One or more embodiments may provide a visual search pipeline that allows to exploit e.g., both color and depth data, by possibly resorting to different image description approaches.

As exemplified in FIG. 2, in one or more embodiments an RGB-D image (e.g., image information including both RGB and depth information D) as acquired e.g., by a mobile device, may be processed in a pipeline configured to independently process (at 20 and 22, respectively) the appearance and shape channels at the client side C, so as to produce (e.g., at $16_{20}$ and $16_{22}$, respectively) compact binary codes $BD_A$ (appearance) and $BD_S$ (shape) that may be concatenated at 24 and sent as a visual search query VSQ to the server S.

In one or more embodiments, each binary code $BD_A$, $BD_S$ may thus be obtained as a result of a two-step process that computes first a global encoding of the whole image and then creates the binary description through a similarity-preserving hashing stage.

Again, at the server side S, the received binary code(s) may be matched against a database DB of descriptions in order to find the most similar image and provide a visual search result VSR to be returned to the client C.

In one or more embodiments, global encoding of the RGB and depth (D) images may take place by aggregating local features as exemplified in the foregoing. Accordingly, local features may be first extracted and described (see e.g., block 10 in FIG. 1) and then globally encoded (see e.g., block 12 in FIG. 1), for instance by using the Fisher kernel procedure [28] (F. Perronnin and C. Dance, Fisher kernels on visual vocabularies for image categorization. *Conference on Computer Vision and Pattern Recognition,* 2007) already discussed in the foregoing.

Also, in one or more embodiments, an approach based on deep neural networks may be adopted so as to address both hand-crafted and learned features.

In one or more embodiments SIFT [36] (Lowe, D. G., Distinctive image features from scale-invariant keypoints, *Int. J. Comput. Vision* 60(2), 91-110 (November 2004)) (with features possibly computed by the OpenCV implementation) may be used as a baseline local description approach, which may detect keypoints through Difference of Gaussians—DoG and produce descriptions having a length D of e.g., D=128.

In one or more embodiments, SIFT may be applied on intensity images without any preprocessing, with depth images rescaled e.g., in the range [1, 255] reserving the 0 value for denoting invalid depths.

In one or more embodiments, isolate depths belonging to a searched object may be dealt with e.g., by modeling the distribution of depths of database images as a Gaussian, by linearly rescaling depths within less than $2\times\sigma$ from the Gaussian mean and saturating the others.

The Fisher kernel method (e.g., with the implementation available in the VLFeat library) may be applied to aggregate SIFT features into a global representation of the entire image.

In one or more embodiments, SIFT descriptors may be computed on 16×16 patches sampled across a regular grid, as uniform sampling of features may turn out to be more effective than keypoint detection in visual search applications. In one or more embodiments, densely computed descriptors are aggregated via a Fisher kernel approach, with $N_G=1$ found to be an adequate choice for the number of components, global encodings of RGB and depth images both have length 2×D.

In one or more embodiments, the RGB-D kernel descriptors introduced in [3, 4] (L. Bo, X. Ren, and D. Fox, Kernel descriptors for visual recognition, *Advances in Neural Information Processing Systems* 23, pages 1-9, 2010; L. Bo, X. Ren, and D. Fox, Depth kernel descriptors for object recognition, Intelligent Robots and Systems, 2011) may provide good results.

For instance, 8 types of kernel descriptors may be considered by defining match kernels for different patch attributes such as intensity and depth gradient, local binary patterns and object size. All the eight types of kernel descriptors may be implemented e.g., in C++. Applying 4 types of kernel descriptors in a C++ implementation may provide satisfactory results.

By adopting such an approach, appearance information (see e.g., blocks 20, $16_{20}$ and $BD_A$ in FIG. 2) may be described by kernels dealing with intensity gradients and color, while shape information (see e.g., blocks 22, $16_{22}$ and $BD_S$ in FIG. 2) may be captured by means of kernels based on depth gradients and Spin Images (see [39] (E. Johnson, M. Hebert, Using Spin Images for Efficient Object Recognition in Cluttered 3D Scenes, IEEE TRANSACTIONS ON PATTERN ANALYSIS AND MACHINE INTELLIGENCE, VOL. 21, NO. 5, May 1999)).

In [16] (S. Gupta, R. Girshick, P. Arbel, and J. Malik, Learning Rich Features from RGB-D Images for Object Detection and Segmentation, *European Conference on Computer Vision*, pages 1-16, 2014), Gupta et al. address the problem of globally encoding an RGB-D image through a Convolutional Neural Network (CNN) architecture by applying a so-called "AlexNet" as proposed in [35] (Krizhevsky, A., Sutskever, I., Hinton, G. E, ImageNet Classification with Deep Convolutional Neural Networks, Advances In Neural Information Processing Systems 1-9 (2012)), that processes a 256×256 RGB image and can produce a 4096-dimensional feature vector as output of the last hidden layer. In addition to describing an RGB image, the authors in [16] (S. Gupta, R. Girshick, P. Arbel, and J. Malik, Learning Rich Features from RGB-D Images for Object Detection and Segmentation, *European Conference on Computer Vision*, pages 1-16, 2014) deploy a representation designated HHA to map the depth image into three channels: Horizontal disparity, Height above ground and Angle between local surface normal and inferred gravity direction. Accordingly, AlexNet may also be fed with the HHA representation as if it were an RGB image. Such an approach is based on the hypothesis that RGB images and depth images D may share common structures due to, e.g., disparity edges corresponding to object boundaries in RGB images. Moreover, fine tuning of AlexNet may be performed based on HHA data.

In one or more embodiments, satisfactory results can be achieved by feeding the hashing stages $16_{20}$, $16_{22}$ with e.g., 100 principal components of 4096-dimensional vectors computed by both the RGB and HHA networks. As already indicated previously, a Spherical Hashing (SH) method [17] (J.-P. Heo, Y. Lee, J. He, S.-F. Chang, and S.-E. Yoon, Spherical hashing, *Conference on Computer Vision and Pattern Recognition*, pages 2957-2964, 2012) may be applied in one or more embodiments e.g., when dealing with large datasets.

In one or more embodiments, an iterative process may be applied to about 1% of the training samples, such percentage having been found to be adequate in training the SH procedure. In one or more embodiments, applying the Spherical hashing distance proposed in [17] (J.-P. Heo, Y. Lee, J. He, S.-F. Chang, and S.-E. Yoon, Spherical hashing, Conference on Computer Vision and Pattern Recognition, pages 2957-2964, 2012) was not found to provide appreciable improvements over a standard Hamming distance.

As exemplified in FIG. 2, in one or more embodiments the appearance binary codes $BC_A$ and the shape binary codes $BC_S$ may be juxtaposed at 24 to form a final binary code. This may be included in visual search query VSQ sent to a server S to be matched against a database DB of stored binary codes.

In one or more embodiments, this may be based e.g., on a Hamming distance together with a weighted k-NN search approach as described in [13] (S. A. Dudani, The Distance-Weighted k-Nearest-Neighbor Rule, *Transactions on Systems, Man, and Cybernetics*, pages 325-327, 1976). In one or more embodiments the search for the k-NNs may be speeded-up by indexing the server side database DB by resorting to the multi-probe LSH scheme proposed in [26] (Q. Lv, W. Josephson, Z. Wang, M. Charikar, and K. Li, Multi-probe LSH: efficient indexing for high-dimensional similarity search, *International Conference on Very Large Data bases*, 2007).

One or more embodiments may thus involve combining bi-dimensional and tri-dimensional compact visual descriptors into a single query for visual search purposes (see e.g., VSQ in FIGS. 1 and 2).

Figure 4:
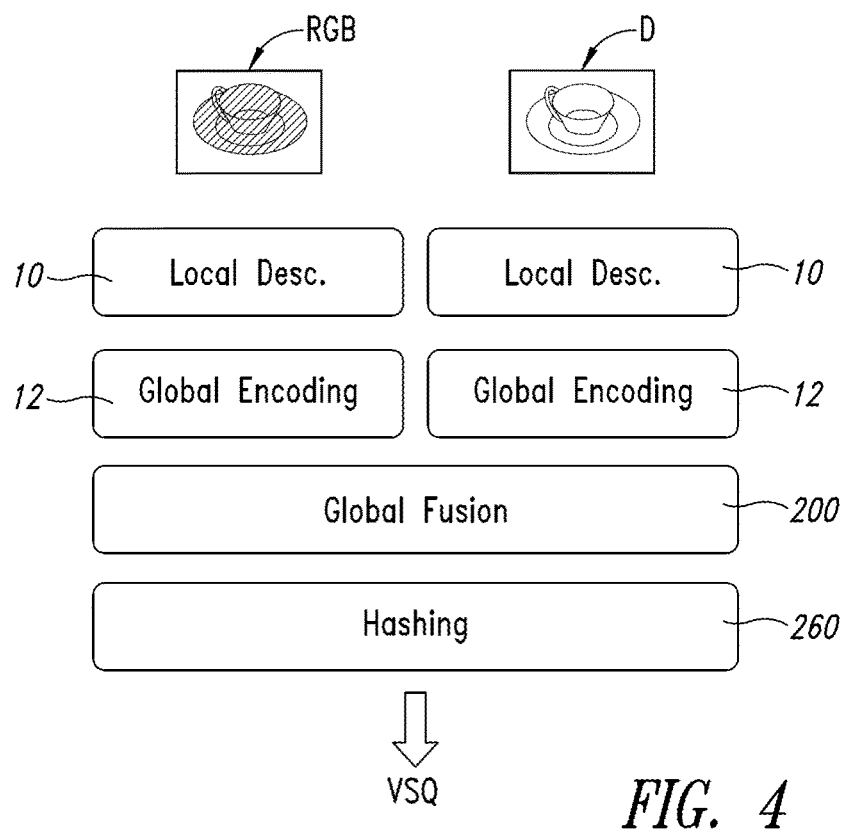
FIG. 4 is another schematic representation of one or more embodiments.
Figure 5:
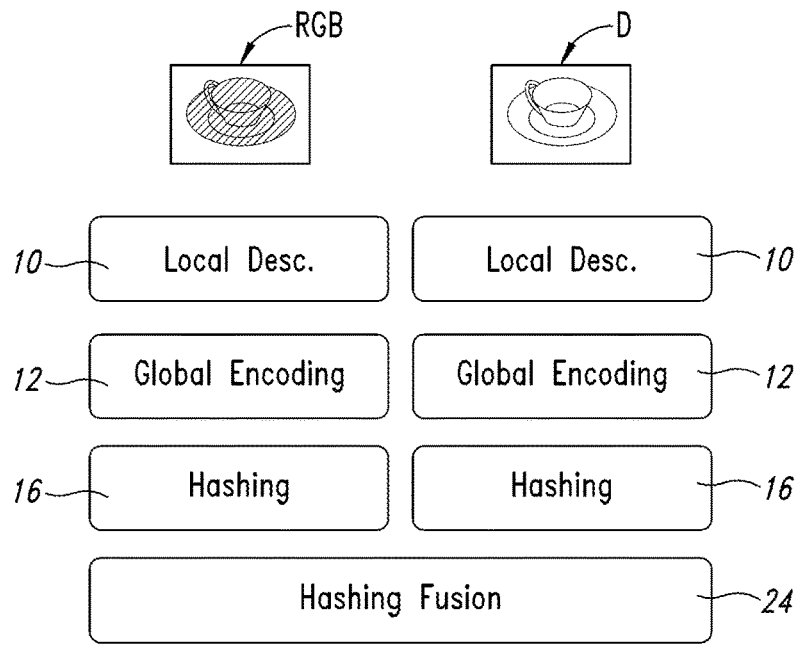
FIG. 5 is still another schematic representation of one or more embodiments.

FIGS. 3 to 5 are exemplary of different possible architectures which may operate on the basis of the principles exemplified in the foregoing, that is of different ways of combining the types of processing previously discussed in connection with FIGS. 1 and 2.

The exemplary embodiments of FIGS. 3 to 5 will be assumed to operate on RGB image (left side) and a depth image D (right side).

In FIGS. 3 to 5, the blocks 10 are exemplary of a set of patches being extracted and described by local descriptors for both images (RGB, D). It will be appreciated that throughout FIGS. 3 to 5 the same numbering of FIGS. 1 and 2 has been deliberately retained for immediate reference to the possible implementation feature discussed in detail in the foregoing.

For instance, in one or embodiments, e.g., 4 types of Kernel descriptors (local description stage) may be used such as Intensity Gradients, Color, Depth Gradients, Spin Images: see e.g., [3,4] (L. Bo, X. Ren, and D. Fox, Kernel descriptors for visual recognition, *Advances in Neural Information Processing Systems* 23, pages 1-9, 2010; L. Bo, X. Ren, and D. Fox, Depth kernel descriptors for object recognition, Intelligent Robots and Systems, 2011); for global encoding, Fisher kernels (global description) may be used: see e.g., [19, 28] (T. Jaakkola and D. Haussler, Exploiting generative models in discriminative classifiers, *Advances in Neural Information Processing Systems*, 1999; F. Perronnin and C. Dance, Fisher kernels on visual vocabularies for image categorization, *Conference on Computer Vision and Pattern Recognition*, 2007); for hashing, e.g., binary hashing, Spherical Hashing (SH) may be used: see e.g., [5] (L. Bo, X. Ren, and D. Fox, Unsupervised feature learning for rgb-d based object recognition, *International Symposium on Experimental Robotics*, pages 1-15, 2012).

The stages of the possible processing pipelines exemplified in FIGS. 3 to 5 following the local description blocks 10 may be largely "agnostic" to the type of local description. They may thus operate satisfactorily both in the case of local description based on appearance (RGB image) and in the case of shape (depth image).

The processing pipelines exemplified in FIGS. 3 to 5 may otherwise differ in the sequence adopted in applying fusion, encoding and hashing starting from the local descriptions (blocks 10).

In one or more embodiments as exemplified in FIG. 3, local fusion 100 is applied to the local descriptions of blocks 10, followed by global encoding 120 and binary hashing 160 of the result of global encoding. That is, in one or more embodiments as exemplified in FIG. 3, the local descriptors corresponding to patches in the RGB and depth images are computed and juxtaposed (e.g., even without previous compression to binary codes) so that appearance and shape information may be fused, e.g., as indicated at 100. For instance, Fisher kernels may therefore be trained on the concatenation of the appearance and shape descriptions of image patches.

In one or more embodiments as exemplified in FIG. 4, global encoding 12 is applied to the local descriptions of blocks 10, followed by fusion at 200 of the results of global encoding and binary hashing 260 of the result of the fusion at 200. That is, in one or more embodiments as exemplified in FIG. 4, global descriptors are computed at 12 for appearance and shape separately and then concatenated at 200 before being delivered to the hashing stage 260.

In one or more embodiments as exemplified in FIG. 5 (which essentially corresponds to a direct fusion of the layouts of FIGS. 1 and 2), global encoding 12 is applied to the local descriptions of blocks 10, followed by binary hashing 16 of the results of global fusion and juxtaposing or concatenating (that is, fusing) at 24 the results of hashing. That is, in one or more embodiments as exemplified in FIG. 5, binary codes for RGB and depth images D are computed independently (at 12 and 16) to be eventually fused at 24 just before the matching stage.

Whatever the specific solution considered, one or more embodiments as exemplified in FIGS. 3 to 5 rely on the common principle of generating queries VSQ for visual searches by acquiring the input images used to generate the visual search query both as digital image information (e.g., color information such as RGB) and digital depth information D associated therewith and extracting (e.g., at 10; 10a, 10b (see FIG. 6)) from the digital color information RGB and digital depth information D local descriptors conveying (e.g., as binary code) an appearance description (e.g., 20 and $BD_A$ in FIG. 2) and a shape description (e.g., 22 and $BD_S$ in FIG. 2) of the images. The visual search query VSQ may be generated by fusing (e.g., at 100; 200; 24) binary code representative of the appearance description and binary code representative of the shape description of the image.

The local descriptors extracted from the digital image information (e.g., RGB) and digital depth information D may be subjected to processing including:
  i) global encoding (e.g., at 12; 12a, 12b; 120) by aggregating into a global encoding of the images the local descriptors extracted from the digital image information (e.g., RGB) and digital depth information (D), and
  ii) hashing (e.g., binary hashing at 16; 16a, 16b; 160) the global encoding (12; 12a, 12b; 120) of the images.

The visual search queries VSQ may be generated from the results of global encoding and binary hashing applied to the local descriptors extracted from the digital image information RGB and the digital depth information D.

It will again be stressed that referring to RGB-D images being acquired is merely by way of example and for ease of explanation. As indicated, in one or more embodiments depth information may be acquired "indirectly" e.g., from two or more images obtained from different viewpoints. Similarly, color images other than RGB (e.g., YUV) and even non-color images (e.g., grey scale digital image information) may be used in one or more embodiments.

Figure 6:
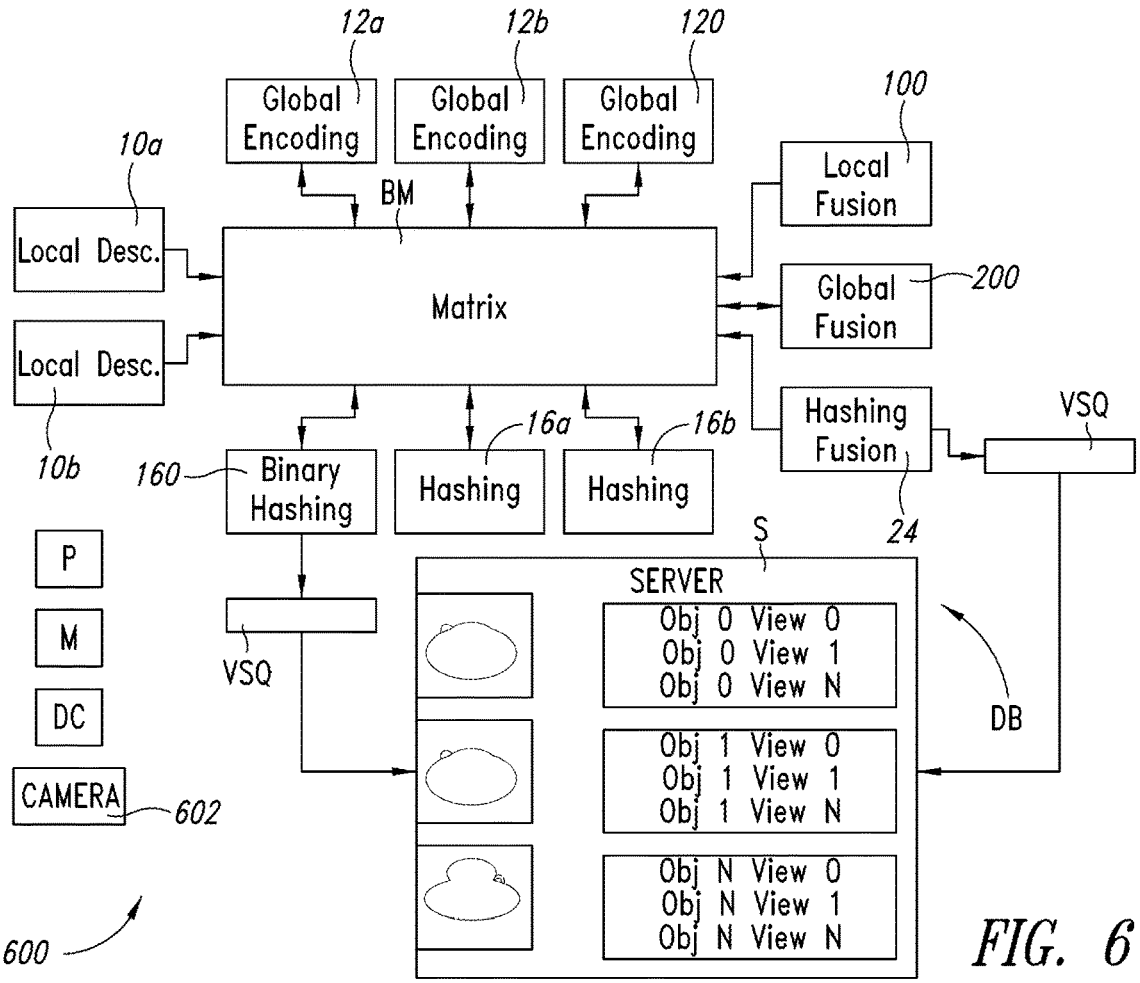
FIG. 6 is a block diagram exemplary of a possible implementation of one or more embodiments.

FIG. 6 shows how various processing blocks as exemplified in connection with FIGS. 3 to 5 may be combined into a flexible architecture in a system 600 where flexibility may be achieved e.g., via a matrix BM configured to interconnect various processing resources in order to achieve the various pipeline architectures exemplified in FIGS. 3 to 5. The system 600 of FIG. 6 includes digital image processing circuitry, which is illustrated as a digital image processor P, a memory M, and discrete circuitry DC, which, in alone or in various combinations, implement one or more of the methods disclosed herein. As illustrated, the system of FIG. 6 includes one or more digital image capture devices 602 (e.g., cameras), which may capture digital images to be processed by the system 600.

In the block diagram of FIG. 6 those blocks configured for operating after juxtaposition/fusion of the RGB and D information have been denoted with the same reference numerals as already appearing in FIGS. 3 to 5. Conversely, those blocks configured for operating separately on the RGB and D information before juxtaposition/fusion have been denoted with the same reference numerals as already appearing in FIGS. 3 to 5, labelled with suffixes "a" and "b" for 2D and 3D processing, respectively: for instance, in the block diagram of FIG. 6, 2D local description and 3D local description are denoted 10a, and 10b, respectively.

Again, in any of the architectures of FIGS. 3 to 5 as possibly implemented as per the exemplary block diagram of FIG. 6, indexing the server database DB and enabling the search process in response to 2D/3D visual search queries VSQ may involve e.g., multi-probe LSH [26] (Q. Lv, W. Josephson, Z. Wang, M. Charikar, and K. Li, Multi-probe LSH: efficient indexing for high-dimensional similarity search, *International Conference on Very Large Data bases*, 2007) and weighted k-NN Classifier [13] (S. A. Dudani, The Distance-Weighted k-Nearest-Neighbor Rule, *Transactions on Systems, Man, and Cybernetics*, pages 325-327, 1976) for descriptor matching.

In one or more embodiments, allocation of the binary code (e.g., $BD_A$ and $BD_S$ in FIG. 2) in forming the visual search query VSQ may be fixed, e.g., with, say ¼ of the binary code allocated to shape and ¾ to appearance.

One or more embodiments, e.g., in the case of hashing fusion, may provide for making allocation of the binary code to appearance v. shape dynamically variable (e.g., by increasing the amount of binary code allocated to appearance and decreasing the amount of binary code allocated to shape or vice-versa).

In one or more embodiments this may occur e.g., as a function of feedback from the server S.

For instance, a first allocation is adopted by the client C to form a query VSQ which is sent to the server S. The server performs a search and produces a certain recognition score.

This information may indicate that the number of retrieved images may be increased, e.g., because associated "success" scores computed by the server retrieval engine may be under a certain threshold.

This information may be fed back to the client C where the appearance v. shape code allocation may be modified and a modified query VSQ formed.

In addition or as an alternative to the foregoing, in one or more embodiments, allocation of the binary code to appearance v. shape may be dynamically varied as a function of the bandwidth available for communication between the client C and the server S. That is, one or more embodiments may provide for selectively varying the respective amounts of (e.g., the binary codes $BD_A$, $BD_S$ allocated to) the appearance description and the shape description of the image in generating the visual search query VSQ.

Various experimental investigations of one or more embodiments have been performed by using e.g., the RGB-D Object Dataset [23] (K. Lai, L. Bo, X. Ren, and D. Fox, A large-scale hierarchical multi-view rgb-d object dataset, *International Conference on Robotics and Automation*, pages 1817-1824, 2011), a de-facto standard for evaluating and comparing visual recognition systems relying on RGB-D sensing. For each of the 300 household objects included in the dataset, a set of acquisitions from different vantage points has been collected and segmented from the background so as to gather a total of 41,877 RGB-D images, with each object belonging to one of 51 categories based on the WordNet hierarchy.

The test analysis revealed no loss in recognition rate and about a 10× speedup in applying the approximated mpLSH indexing scheme in place of an exhaustive search provided an adequate description length is deployed within the hashing process.

Out of the three exemplary methods considered for global encoding, EMK and Fisher kernel were found to be particularly effective, with EMK capable of incorporating spatial information by aggregating local features in pyramidal sub-regions and juxtaposing the encodings of each subregion, whereas Fisher kernel and VLAD may not rely on information concerning the position of local features. Fisher kernel may presumably yield better results than EMK in scenarios involving in-plane rotations and distance variations of the RGB-D sensor while capturing the objects.

The shape and appearance information were found to contribute separately to the recognition capability, with their synergy improving overall performance. In the case of instance recognition, the appearance information was found to provide a stronger contribution to the recognition ability while shape proved to have a more limited descriptive power. Conversely, in category recognition shape features were found to be more effective in discriminating the categories comprising the dataset. In category recognition scenarios, both RGB and depth information may contribute notably to ascertaining the class to which a query object does belong. In instance recognition tasks, appearance features, like texture and color, may facilitate telling apart the specific object instances stored into the database, whereas depth furnishes an informative, while limited, contribution.

Also, keeping processing of the two information flows as disjoint as possible along a recognition pipeline (see e.g., FIG. 5) may represent an effective strategy, with hashing fusion (at 24) possibly allowing the server to match the two descriptions separately, which may facilitate addressing application scenarios where only one of the two descriptions may be available in either the query image or some database objects or where either appearance or shape may not be considered reliable enough, e.g., when acquiring a transparent object and/or if the RGB image is captured under low lighting conditions. Also, in the case of hashing fusion, the possibility may exist of making allocation of the binary code to appearance v. shape dynamically variable.

At least in certain cases, deploying all the available kernel descriptors, rather than the intensity and depth gradient match kernels only, was found to improve the recognition rate.

Comparisons may be carried out also with search engines dealing with RGB images such as e.g., (CDVS) [1] (ISO/IEC JTC 1/SC 29/WG 11, Information technology Multimedia content description interface—Part 13: Compact descriptors for visual search (2014)), wherein description may be possibly enriched by sending to the server, in addition to the compressed global encoding, a compressed version of the local SIFT descriptors as well as an histogram-based encoding of the feature coordinates subjected to a geometric consistency check by means of the DISTAT algorithm of [25] (S. Lepsoy, G. Francini, G. Cordara, P. Porto, and B. de Gusmiio, Statistical modelling of outliers for fast visual search, *International Conference on Multimedia and Expo,* 2011).

Comparison with CVDS by using a pipeline as per the embodiments equipped with either EMK or Fisher kernel as global encoder showed a greater effectiveness of the embodiments in both tasks of category and instance recognition. The embodiments also proved to have reduced bandwidth requirements, with high recognition rates reached by transmitting e.g., 1024 bits, in comparison with binary codes of 1024 bytes in the case of instance recognition and 4 K bytes if applied to category recognition for CDVS.

Pipelines featuring densely computed kernel descriptors aggregated at the image level through Fisher kernel followed by PCA and Spherical Hashing were found to be particularly effective, with satisfactory recognition rates achieved with binary codes as compact as 512-1024 bits in both category and instance retrieval experiments. Keeping the processing flows of the color (RGB) and depth (D) channels separate to concatenate the final binary codes was found not to penalize performance while potentially allowing for a great deal of flexibility at the system and application level.

Further experimentation performed by using the CIN 2D+3D dataset [7] (B. Browatzki and J. Fischer, Going into depth: Evaluating 2D and 3D cues for object classification on a new, large-scale object dataset, *International Conference on Computer Vision Workshops,* 2011) and the BigBIRD dataset [30] (A. Singh, J. Sha, K. S. Narayan, T. Achim, and P. Abbeel, BigBIRD: A large-scale 3D database of object instances, *International Conference on Robotics and Automation,* pages 509-516, 2014) shows that methods leveraging on densely computed local descriptors may in some cases provide better results than encoding based on SIFT keypoints, with particularly satisfactory performance provided by representations based on Kernel descriptors and deep features. With CIN 2D+3D, a satisfactory recognition rate was found to be reached by allocating ¼ of the binary code to shape, while a ratio of 1/8 was found to be satisfactory for both the RGB-D Object dataset as well as BigBIRD.

As indicated, one or more embodiments may however provide for making allocation of the binary code to appearance v. shape dynamically variable, e.g., as a function of feedback from the server S and/or the bandwidth available for communication between the client C and the server S.

An approach based on Kernel descriptors or deep features followed by Spherical Hashing (SH) was found to provide effective and compact image encoding. Deep features computed through Convolutional Neural Networks may facilitate representing appearance, whereas Kernel descriptors were found to facilitate capturing shape information.

An architecture according to embodiments may be ported on a Samsung™ Galaxy Tab Pro 10.1™ equipped with the sensing device known under the trade name of Structure Sensor™ for the acquisition of the depth image. A pipeline deploying four types of Kernel Descriptors and trained on the RGB-D Object Dataset may take an average of 550 ms for producing the binary code and 2 ms to perform matching.

Some embodiments may take the form of or comprise computer program products. For example, according to one embodiment there is provided a computer readable medium comprising a computer program adapted to perform one or more of the methods or functions described above. The medium may be a physical storage medium (see memory M in FIG. 6) such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof. See, for example, processor P and discrete circuitry DC in FIG. 6.

LIST OF REFERENCES

[1] ISO/IEC JTC 1/SC 29/WG 11, Information technology Multimedia content description interface—Part 13: Compact descriptors for visual search. (2014).

[2] M. Blum, J. Wulfing, and M. Riedmiller. A learned feature descriptor for object recognition in RGB-D data. *International Conference on Robotics and Automation,* pages 1298-1303, 2012.

[3] L. Bo, X. Ren, and D. Fox. Kernel descriptors for visual recognition. *Advances in Neural Information Processing Systems* 23, pages 1-9, 2010.

[4] L. Bo, X. Ren, and D. Fox. Depth kernel descriptors for object recognition. *Intelligent Robots and Systems,* 2011.

[5] L. Bo, X. Ren, and D. Fox. Unsupervised feature learning for rgb-d based object recognition. *International Symposium on Experimental Robotics,* pages 1-15, 2012.

[6] L. Bo and C. Sminchisescu. Efficient match kernel between sets of features for visual recognition. *Advances in Neural Information Processing Systems*, pages 1-9, 2009.

[7] B. Browatzki and J. Fischer. Going into depth: Evaluating 2D and 3D cues for object classification on a new, large-scale object dataset. *International Conference on Computer Vision Workshops*, 2011.

[8] M. Calonder, V. Lepetit, C. Strecha, and P. Fua. Brief: Binary robust independent elementary features. *European Conference on Computer Vision*, 2010.

[9] V. Chandrasekhar, M. Makar, G. Takacs, D. Chen, S. S. Tsai, N.-M. Cheung, R. Grzeszczuk, Y. Reznik, and B. Girod. Survey of SIFT compression schemes. *International Conference on Pattern Recognition*, 2010.

[10] V. Chandrasekhar, G. Takacs, D. M. Chen, S. S. Tsai, M. Makar, and B. Girod. Feature Matching Performance of Compact Descriptors for Visual Search. *Data Compression Conference*, 2014.

[11] V. Chandrasekhar, G. Takacs, D. M. Chen, S. S. Tsai, Y. Reznik, R. Grzeszczuk, and B. Girod. Compressed Histogram of Gradients: A Low-Bitrate Descriptor. *International Journal of Computer Vision*, 2011.

[12] D. M. Chen, S. S. Tsai, V. Chandrasekhar, G. Takacs, J. Singh, and B. Girod. Tree Histogram Coding for Mobile Image Matching. *Data Compression Conference*, pages 143-152, 2009.

[13] S. a. Dudani. The Distance-Weighted k-Nearest-Neighbor Rule. *Transactions on Systems, Man, and Cybernetics*, pages 325-327, 1976.

[14] F. Endres, J. Hess, J. Sturm, D. Cremers, and W. Burgard. 3D Mapping with an RGB-D Camera. *Transactions on robotics*, pages 1-11, 2012.

[15] B. Girod, V. Chandrasekhar, D. M. Chen, N.-M. Cheung, R. Grzeszczuk, Y. Reznik, G. Takacs, S. S. Tsai, and R. Vedantham. Mobile visual search. *Signal Processing Magazine, IEEE*, (July):61-76, 2011.

[16] S. Gupta, R. Girshick, P. Arbel, and J. Malik. Learning Rich Features from RGB-D Images for Object Detection and Segmentation. *European Conference on Computer Vision*, pages 1-16, 2014.

[17] J.-P. Heo, Y. Lee, J. He, S.-F. Chang, and S.-E. Yoon. Spherical hashing. *Conference on Computer Vision and Pattern Recognition*, pages 2957-2964, 2012.

[18] P. Indyk and R. Motwani. Approximate nearest neighbors: towards removing the curse of dimensionality. *Proceedings of the thirtieth annual ACM symposium on Theory of computing*, pages 604-613, 1998.

[19] T. Jaakkola and D. Haussler. Exploiting generative models in discriminative classifiers. *Advances in Neural Information Processing Systems*, 1999.

[20] H. Jegou, M. Douze, C. Schmid, and P. Perez. Aggregating local descriptors into a compact image representation. *Conference on Computer Vision and Pattern Recognition*, 2010.

[21] R. Ji, L.-Y. Duan, J. Chen, H. Yao, J. Yuan, Y. Rui, and W. Gao. Location Discriminative Vocabulary Coding for Mobile Landmark Search. *International Journal of Computer Vision*, pages 290-314, 2011.

[22] M. Johnson. Generalized Descriptor Compression for Storage and Matching. *British Machine Vision Conference*, pages 23.1-23.11, 2010.

[23] K. Lai, L. Bo, X. Ren, and D. Fox. A large-scale hierarchical multi-view rgb-d object dataset. *International Conference on Robotics and Automation*, pages 1817-1824, 2011.

[24] S. Lazebnik, C. Schmid, and J. Ponce. Beyond bags of features: Spatial pyramid matching for recognizing natural scene categories. *Conference on Computer Vision and Pattern Recognition*, 2006.

[25] S. Lepsoy, G. Francini, G. Cordara, P. Porto, and B. de Gusmiio. Statistical modelling of outliers for fast visual search. *International Conference on Multimedia and Expo*, 2011.

[26] Q. Lv, W. Josephson, Z. Wang, M. Charikar, and K. Li. Multi-probe LSH: efficient indexing for high-dimensional similarity search. *International Conference on Very Large Data bases*, 2007.

[27] T. Nakashika, T. Hori, T. Takiguchi, and Y. Ariki. 3D-Object Recognition Based on LLC Using Depth Spatial Pyramid. *International Conference on Pattern Recognition*, 2014.

[28] F. Perronnin and C. Dance. Fisher kernels on visual vocabularies for image categorization. *Conference on Computer Vision and Pattern Recognition*, 2007.

[29] J. Shotton, A. Fitzgibbon, M. Cook, T. Sharp, M. Finocchio, R. Moore, A. Kipman, and A. Blake. Real-time human pose recognition in parts from single depth images. *Computer Vision and Pattern Recognition*, pages 1297-1304, 2011.

[30] A. Singh, J. Sha, K. S. Narayan, T. Achim, and P. Abbeel. BigBIRD: A large-scale 3D database of object instances. *International Conference on Robotics and Automation*, pages 509-516, 2014.

[31] R. Socher, B. Huval, B. Bhat, C. D. Manning, and A. Y. Ng. Convolutional-Recursive Deep Learning for 3D Object Classification. *Advances in Neural Information Processing Systems*, pages 1-9, 2012.

[32] T. Trzcinski, C. Christoudias, P. Fua, and V. Lepetit. Boosting Binary Keypoint Descriptors. *Computer Vision and Pattern Recognition*, 2013.

[33] K. Venkataraman, D. Lelescu, J. Duparr, A. McMahon, G. Molina, P. Chatterjee, and R. Mullis. PiCam: an ultrathin high performance monolithic camera array. *Siggraph Asia*, 2013.

[34] K.-T. Yu, S.-H. Tseng, and L.-C. Fu. Learning hierarchical representation with sparsity for RGB-D object recognition. *International Conference on Intelligent Robots and Systems*, pages 3011-3016, 2012.

[35] Krizhevsky, A., Sutskever, I., Hinton, G. E. ImageNet Classification with DeepConvolutional Neural Networks. Advances In Neural Information Processing Systems 1-9 (2012)

[36] Lowe, D. G. Distinctive image features from scale-invariant keypoints. Int. J. Comput. Vision 60(2), 91-110 (November 2004)

[37] Malaguti, F., Tombari, F., Salti, S., Pau, D., Di Stefano, L. Toward Compressed 3D Descriptors. International Conference on 3D Imaging, Modeling, Processing, Visualization & Transmission 176-183 (October 2012)

[38] Nascimento, E. R., Oliveira, G. L., Campos, M. F. M., Vieira, A. W., Schwartz, W. R. BRAND: A robust appearance and depth descriptor for RGB-D images. International Conference on Intelligent Robots and Systems 1720-1726 (October 2012).

[39] E. Johnson, M. Hebert. Using Spin Images for Efficient Object Recognition in Cluttered 3D Scenes. IEEE TRANSACTIONS ON PATTERN ANALYSIS AND MACHINE INTELLIGENCE, VOL. 21, NO. 5, May 1999.

Without prejudice to the underlying principles, the details and embodiments may vary, even significantly, with respect to what has been described in the foregoing by way of example only.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
extracting, using digital image processing circuitry, local descriptors from digital image information and digital depth information related to one or more digital images, the local descriptors conveying appearance description information and shape description information related to said one or more digital images, wherein the digital image information is generated using one or more RGB sensors and the digital depth information is generated using one or more depth sensors;
generating, using the digital image processing circuitry, one or more global representations of the one or more digital images based on the extracted local descriptors;
hashing, using the digital image processing circuitry, the one or more global representations of the one or more digital images; and
generating, using the digital image processing circuitry, one or more visual search queries based on the hashed one or more global representations, wherein the one or more visual search queries include fused appearance description information and shape description information conveyed in the local descriptors extracted from the digital image information generated using one or more RGB sensors and the digital depth information generated using one of more depth sensors.

2. The method of claim 1, comprising:
fusing local descriptors extracted from said digital image information and local descriptors extracted from said digital depth information; and
generating the one or more global representations of the one or more digital images based on the fused local descriptors.

3. The method of claim 1, comprising:
fusing appearance description information and shape description information included in the one or more global representations; and
subsequently hashing the one or more global representations.

4. The method of claim 1, comprising fusing appearance description information and shape description information after the hashing of the one or more global representations.

5. The method of claim 1 wherein the digital image information includes digital color information.

6. The method of claim 5 wherein the one or more digital images comprise RGB-D digital images.

7. The method of claim 1, comprising:
selectively varying respective amounts of said appearance description information and shape description information included in the fused appearance description information and shape description information of the visual search queries.

8. The method of claim 1, comprising:
sensing the digital image information and the digital depth information of an image of the one or more digital images using an RGB-D image sensor including the one or more RGB sensors and the one or more depth sensors.

9. An apparatus, comprising:
one or more memories, which, in operation, store digital image information; and
digital image processing circuitry coupled to the one or more memories, wherein the digital image processing circuitry, in operation:
extracts local descriptors from RGB sensor digital image information and depth sensor digital depth information related to one or more digital images, the local descriptors conveying appearance description information and shape description information related to said one or more digital images;
generates one or more global representations of the one or more digital images based on the extracted local descriptors;
hashes the one or more global representations of the one or more digital images; and
generates one or more visual search queries based on the hashed one or more global representations, wherein the one or more visual search queries include fused appearance description information and shape description information conveyed in the local descriptors, the digital image information is generated using one or more RGB sensors and the digital depth information is generated using one of more depth sensors.

10. The apparatus of claim 9 wherein the digital image processing circuitry, in operation:
fuses local descriptors extracted from said digital image information and local descriptors extracted from said digital depth information; and
generates the one or more global representations of the one or more digital images based on the fused local descriptors.

11. The apparatus of claim 9 wherein the digital image processing circuitry, in operation:
fuses appearance description information and shape description information included in the one or more global representations; and
hashes the one or more global representations including the fused appearance description information and shape description information.

12. The apparatus of claim 9 wherein the digital image processing circuitry, in operation, fuses appearance description information and shape description information included in the hashed one or more global representations.

13. The apparatus of claim 9 wherein the one or more digital images comprise RGB-D digital images.

14. The apparatus of claim 9 wherein the digital image processing circuitry, in operation, selectively varies respective amounts of said appearance description information and shape description information included in the fused appearance description information and shape description information of the visual search queries.

15. The apparatus of claim 14 wherein the digital image processing circuitry, in operation, selective varies the respective amounts in response to a visual search response signal.

16. The apparatus of claim 9, comprising an integrated circuit including the digital image processing circuitry.

17. The apparatus of claim 9, comprising one or more RGB-D image sensors.

18. A system, comprising:
one or more image capture devices, which, in operation, capture digital images, the one or more image capture devices including one or more RGB image sensors and one or more digital depth sensors; and
digital image processing circuitry coupled to the one or more image capture devices, wherein the digital image processing circuitry, in operation:
extracts local descriptors from RGB digital image information and digital depth information related to one or more captured digital images, the local descriptors conveying appearance description information and shape description information related to said one or more digital images;
generates one or more global representations of the one or more digital images based on the extracted local descriptors;
hashes the one or more global representations of the one or more digital images; and
generates one or more visual search queries based on the hashed one or more global representations, wherein the one or more visual search queries include fused appearance description information and shape description information conveyed in the local descriptors, the digital image information is generated using the one or more RGB sensors and the digital depth information is generated using the one of more depth sensors.

19. The system of claim 18 wherein the digital image processing circuitry, in operation:
fuses local descriptors extracted from said digital image information and local descriptors extracted from said digital depth information; and
generates the one or more global representations of the one or more digital images based on the fused local descriptors.

20. The system of claim 18 wherein the digital image processing circuitry, in operation:
fuses appearance description information and shape description information included in the one or more global representations; and
hashes the one or more global representations including the fused appearance description information and shape description information.

21. The system of claim 18 wherein the digital image processing circuitry, in operation, fuses appearance description information and shape description information included in the hashed one or more global representations.

22. The system of claim 18 wherein the digital image processing circuitry, in operation, selectively varies respective amounts of said appearance description information and shape description information included in the fused appearance description information and shape description information of the visual search queries.

23. A non-transitory computer-readable medium having contents which cause digital image processing circuitry to generate one or more visual search queries, by:
extracting local descriptors from digital image information and digital depth information related to one or more digital images, the local descriptors conveying appearance description information and shape description information related to said one or more digital images, wherein the digital image information is generated using one or more RGB sensors and the digital depth information is generated using one or more depth sensors;
generating one or more global representations of the one or more digital images based on the extracted local descriptors;
hashing the one or more global representations of the one or more digital images; and
generating one or more visual search queries based on the hashed one or more global representations, wherein the one or more visual search queries include fused appearance description information and shape description information conveyed in the local descriptors extracted from the digital image information generated using one or more RGB sensors and the digital depth information generated using one of more depth sensors.

24. The non-transitory computer-readable medium of claim 23 wherein the contents cause the digital image processing circuitry to perform at least one of:
fusing local descriptors extracted from said digital image information and local descriptors extracted from said digital depth information;
fusing appearance description information and shape description information included in the one or more global representations; and
fusing appearance description information and shape description information included in the hashed one or more global representations.

25. The non-transitory computer-readable medium of claim 23 wherein the contents cause the digital image processing circuitry to selectively vary respective amounts of said appearance description information and shape description information included in the fused appearance description information and shape description information of the visual search queries.

* * * * *

UNITED STATES PATENT AND TRADEMARK OFFICE
CERTIFICATE OF CORRECTION

PATENT NO. : 10,585,937 B2  
APPLICATION NO. : 15/070470  
DATED : March 10, 2020  
INVENTOR(S) : Danilo Pietro Pau et al.

Page 1 of 1

It is certified that error appears in the above-identified patent and that said Letters Patent is hereby corrected as shown below:

On the Title Page

Page 2, under item (56), Other Publications, Column 2, Line 65:
"Permonnin" should read -- Perronnin --.

In the Claims

Column 21, Line 41, Claim 1:
"of" should read -- or --.

Column 22, Line 30, Claim 9:
"of" should read -- or --.

Column 23, Line 28, Claim 18:
"of" should read -- or --.

Column 24, Line 28, Claim 23:
"of" should read -- or --.

Signed and Sealed this  
Twenty-sixth Day of May, 2020

Andrei Iancu  
*Director of the United States Patent and Trademark Office*